(12) United States Patent
Jojima et al.

(10) Patent No.: US 10,396,668 B1
(45) Date of Patent: Aug. 27, 2019

(54) POWER CONVERTER

(71) Applicant: TOYOTA JIDOSHA KABUSHIKI KAISHA, Toyota-shi, Aichi (JP)

(72) Inventors: Yuki Jojima, Nagoya (JP); Shuichi Iwata, Nisshin (JP); Hiromi Yamasaki, Toyota (JP); Tomoo Yamabuki, Nagoya (JP); Hitoshi Imura, Chirya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/238,181

(22) Filed: Jan. 2, 2019

(30) Foreign Application Priority Data

Feb. 6, 2018 (JP) .................................. 2018-019556

(51) Int. Cl.
| | | |
|---|---|---|
| *B60L 1/00* | (2006.01) | |
| *H02M 3/158* | (2006.01) | |
| *H02M 3/335* | (2006.01) | |
| *H02M 1/00* | (2006.01) | |

(52) U.S. Cl.
CPC ..... *H02M 3/1588* (2013.01); *H02M 3/33507* (2013.01); *H02M 2001/007* (2013.01)

(58) Field of Classification Search
CPC ............... H02M 3/156; H02M 3/1588; H02M 3/33507; H02M 2001/007; B60L 11/18
USPC ....... 323/225, 234, 235, 265, 267, 271, 274, 323/282–289; 307/9.1, 10.1, 10.07, 44, 307/45, 48, 109, 115, 116; 318/128, 139, 318/492, 494, 801
See application file for complete search history.

(56) References Cited

U.S. PATENT DOCUMENTS

| | | | |
|---|---|---|---|
| 2010/0024458 A1* | 2/2010 | Schmitt | B60H 1/00371 62/239 |
| 2015/0360578 A1* | 12/2015 | Duan | B60L 11/1861 340/455 |
| 2016/0261205 A1* | 9/2016 | Kolar | H02M 5/458 |
| 2017/0008404 A1 | 1/2017 | Oba et al. | |
| 2017/0036550 A1 | 2/2017 | Oba | |

FOREIGN PATENT DOCUMENTS

| | | |
|---|---|---|
| JP | 2015-171246 A | 9/2015 |
| JP | 2016-096620 A | 5/2016 |
| JP | 2017-022872 A | 1/2017 |
| JP | 2017-034925 A | 2/2017 |

* cited by examiner

*Primary Examiner* — Rajnikant B Patel
(74) *Attorney, Agent, or Firm* — Oliff PLC (57) ABSTRACT

A power converter disclosed herein may include power conversion circuits connected in parallel and a cutoff switch provided in each of the power conversion circuits. The cutoff switch may be configured to cut off connection of corresponding one of the power conversion circuits from other power conversion circuit. In the power converter disclosed herein, the cutoff switches of the power conversion circuits may be housed in a first module.

4 Claims, 6 Drawing Sheets

POWER CONVERTER

CROSS-REFERENCE

This application claims priority to Japanese Patent Application No. 2018-019556, filed on Feb. 6, 2018, the entire contents of which are incorporated herein by reference.

TECHNICAL FIELD

A technique disclosed herein relates to a power converter that includes power conversion circuits connected in parallel.

BACKGROUND

A power converter including power conversion circuits connected in parallel has been known. Examples of such a power converter are described in Japanese Patent Application Publication No. 2017-022872 and Japanese Patent Application Publication No. 2017-034925. A power converter that includes power conversion circuits connected in parallel has two major advantages. One is that allowable power for the power converter can be increased since a load can be distributed. The other is that even if one of the power conversion circuits fails, a function of the power converter can be maintained by the other(s) of the power conversion circuits. To realize the latter advantage, the power converter described in each of Japanese Patent Application Publication No. 2017-022872 and Japanese Patent Application Publication No. 2017-034925 includes a cutoff switch configured to cut off connection of a power conversion circuit that fails due to short circuit.

A power conversion circuit includes a multitude of identical or similar switching elements. A power converter that includes a multitude of switching elements may employ a module (a power module) that packages some of the switching elements. Each of Japanese Patent Application Publication No. 2015-171246 and Japanese Patent Application Publication No. 2016-096620 describes a power converter that employs a module that packages a switching element for power conversion and a cutoff switch for current cutoff. In the power converter described in each of Japanese Patent Application Publication No. 2015-171246 and Japanese Patent Application Publication No. 2016-096620, the switching element for power conversion and the cutoff switch are connected in series in the module. The cutoff switch may be a device of a type identical to or different from that of the switching element for power conversion.

SUMMARY

The disclosure herein provides a usage aspect of a power module suitable for a power converter that includes power conversion circuits connected in parallel, and a cutoff switch configured to cut off connection of corresponding one of the power conversion circuits.

A power converter disclosed herein may comprise power conversion circuits connected in parallel and a cutoff switch provided in each of the power conversion circuits. The cutoff switch may be configured to electrically cut off connection of corresponding one of the power conversion circuits from other power conversion circuit. In the power converter disclosed herein, the cutoff switches of the power conversion circuits may be housed in a module. Housing the cutoff switches of the power conversion circuits in one module enables downsizing of the power converter.

As mentioned before, each of the power conversion circuits may include switching elements. One power conversion circuit may employ parallel connection of the switching elements for power conversion. By turning on or off the switching elements connected in parallel in a synchronized manner, an allowable current in the one power conversion circuit can be increased. In an aspect of the power converter disclosed herein, each of the power conversion circuits includes a plurality of switching elements for power conversion connected in parallel. The switching elements for power conversion connected in parallel are housed in a module different from the module in which the cutoff switches of the power conversion circuits are housed. By connecting the switching elements in parallel in one module, an uniform current can flow in the switching elements. For convenience of description, the module that houses the cutoff switches is referred to as a first module or a cutoff module, and the module that houses the switching elements for power conversion is referred to as a second module or a conversion module. By adopting the module (the first module/the cutoff module) that houses the cutoff switches therein and the module (the second module/the conversion module) that houses the switching elements for power conversion therein, the switching elements and the switches can be organized compactly.

In a case where the power converter includes two of the power conversion circuits, in particular. the following configuration is preferable. The power converter includes two second modules which correspond to the two power conversion circuits, respectively. The two second modules are arranged so as to interpose the first module therebetween. The first module houses the cutoff switches of the two power conversion circuits. The two second modules of the power conversion circuits are arranged on both sides of the first module, respectively. The first module is equidistant from both of the two second modules, so inter-module connection is simplified.

The details and further modifications of the technique disclosed herein will be described in the following "DETAILED DESCRIPTION".

DETAILED DESCRIPTION OF INVENTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved power converter.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples. as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 1:
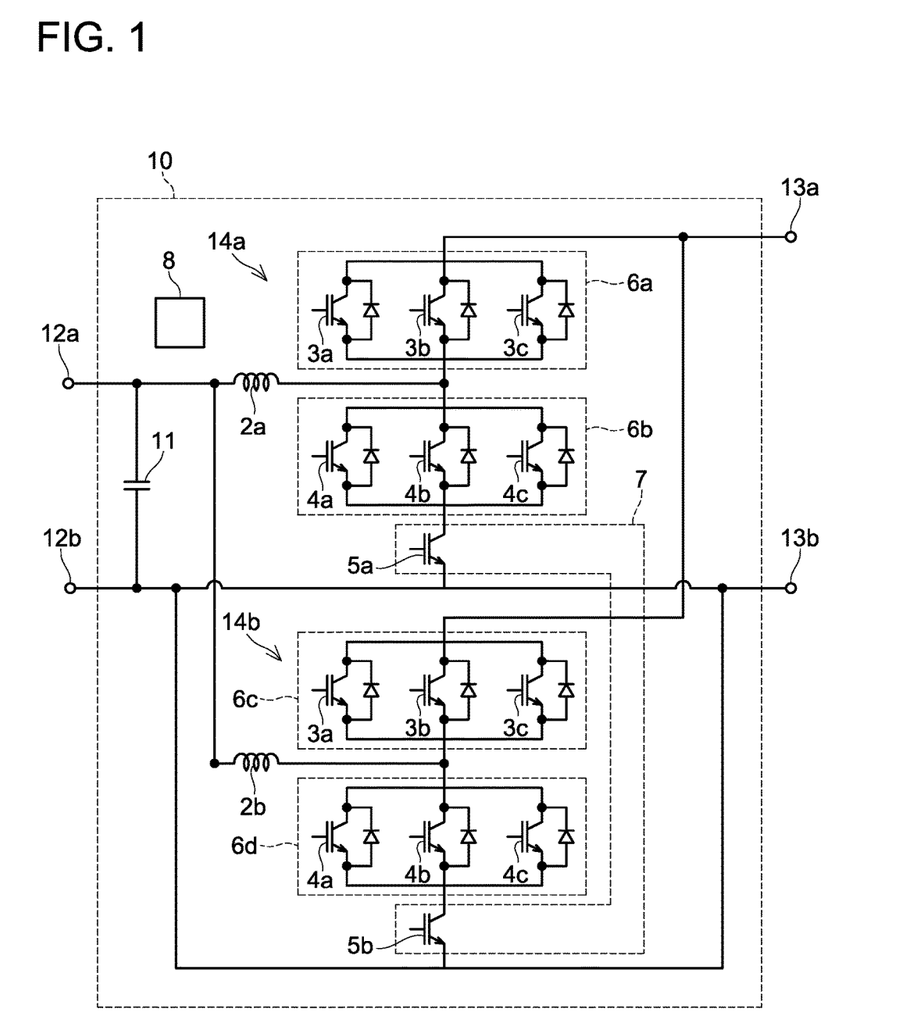
FIG. 1 is a circuit diagram of a power converter in a first embodiment.

With reference to FIGS. 1 to 6, a power converter 10 in a first embodiment will be described. FIG. 1 shows a circuit diagram of the power converter 10. The power converter 10 in the first embodiment is a bidirectional DC-DC converter that has a boosting function of boosting a voltage of power inputted to low-voltage terminals 12 (a low-voltage positive terminal 12a and a low-voltage negative terminal 12b) and outputting the boosted voltage to high-voltage terminals 13 (a high-voltage positive terminal 13a and a high-voltage negative terminal 13b), and a step-down function of stepping down a voltage of power inputted to the high-voltage terminals 13 and outputting the stepped-down voltage to the low-voltage terminals 12.

The power converter 10 includes two power conversion circuits 14a, 14b, a filter capacitor 11, and a controller 8. Both of the two power conversion circuits 14a, 14b are bidirectional DC-DC converters. The two power conversion circuits 14a, 14b are connected in parallel between the low-voltage terminals 12 and the high-voltage terminals 13. The filter capacitor 11 is connected between the low-voltage positive terminal 12a and the low-voltage negative terminal 12b.

The first power conversion circuit 14a will be described. The first power conversion circuit 14a includes three upper arm transistors 3a to 3c, three lower arm transistors 4a to 4c, a cutoff transistor 5a, and a reactor 2a. The three upper arm transistors 3a to 3c are connected in parallel. The three lower arm transistors 4a to 4c are also connected in parallel. For simple description, the three upper arm transistors 3a to 3c will hereinafter be collectively referred to as upper arm transistors 3. Similarly, the three lower arm transistors 4a to 4c will be collectively referred to as lower arm transistors 4.

The upper arm transistors 3, the lower arm transistors 4, and the cutoff transistor 5a are connected in series between the high-voltage positive terminal 13a and the high-voltage negative terminal 13b. The reactor 2a is connected between a midpoint of the series connection of the upper and the lower arm transistors 3, 4, and the low-voltage positive terminal 12a. The low-voltage negative terminal 12b and the high-voltage negative terminal 13b are directly connected. Each of the transistors of the upper arm transistors 3 and the lower arm transistors 4 has a diode connected in inverse parallel therewith.

The second power conversion circuit 14b connected in parallel to the first power conversion circuit 14a will be described. The second power conversion circuit 14b has the same circuit configuration as that of the first power conversion circuit 14a. The second power conversion circuit 14b includes the three upper arm transistors 3a to 3c, the three lower arm transistors 4a to 4c, a cutoff transistor 5b, and a reactor 2b. The three upper arm transistors 3a to 3c are connected in parallel. The three lower arm transistors 4a to 4c are also connected in parallel. Also in the second power conversion circuit 14b. the upper arm transistors 3a to 3c will be collectively referred to as the upper arm transistors 3, and the lower arm transistors 4a to 4c will be collectively referred to as the lower arm transistors 4.

The upper arm transistors 3, the lower arm transistors 4, and the cutoff transistor 5b of the second power conversion circuit 14b are connected in series between the high-voltage positive terminal 13a and the high-voltage negative terminal 13b. The reactor 2b is connected between a midpoint of the series connection of the upper and the lower arm transistors 3, 4, and the low-voltage positive terminal 12a. Each of the transistors of the upper arm transistors 3 and the lower arm transistors 4 has a diode connected in inverse parallel therewith.

The first power conversion circuit 14a includes the three upper arm transistors 3a to 3c connected in parallel, and the three lower arm transistors 4a to 4c connected in parallel. A load imposed on the first power conversion circuit 14a is distributed among the three transistors 3a to 3c (4a to 4c) connected in parallel. Therefore, the first power conversion circuit 14a can withstand a high load. The same applies to the second power conversion circuit 14b.

As shown in FIG. 1, the first and the second power conversion circuits 14a, 14b have the same circuit structure. In the power conversion circuits 14a, 14b, the upper arm transistors 3 contribute to a step-down operation, and the lower arm transistors 4 contribute to a boosting operation. The upper and the lower arm transistors 3, 4 are transistors for power conversion. Transistors of the same type are preferably adopted for the upper and the lower arm transistors 3, 4. Each of the upper and the lower arm transistors 3, 4 is, for example, an insulated gate bipolar transistor (IGBT), but may be a switching element of another type.

The transistors of the first and the second power conversion circuits 14a, 14b are controlled by the controller 8. The controller 8 supplies identical driving signals to the upper arm transistors 3a to 3c of the power conversion circuits 14a, 14b. The controller 8 also supplies identical driving signals. which are different from the driving signals above, to the lower arm transistors 4a to 4c of the power conversion circuits 14a, 14b. Due to this, the two power conversion circuits 14a, 14b function as if they were one power conversion circuit. The power converter 10 is capable of handling a large current by distributing a load to the two power conversion circuits 14a, 14b.

The upper and the lower arm transistors 3, 4, and the cutoff transistors 5a, 5b are controlled by the controller 8. The controller 8 receives a command for a voltage ratio between the low-voltage terminals 12 and the high-voltage terminals 13 from a higher-level controller, which is not shown. Based on the command, the controller 8 generates the driving signals for the upper and the lower arm transistors 3, 4 respectively, and provides these signals to gates of the corresponding transistors. The driving signal for each of the transistors is a PWM signal. The driving signals for the upper arm transistors 3 and the driving signals for the lower arm transistors 4 are complementary PWM signals to each other. By the complementary PWM signals, the upper arm transistors 3 and the lower arm transistors 4 are complementarily switched between on and off. When the complementary PWM signals are provided to the upper and the lower arm transistors 3, 4, each of the power conversion circuits 14a. 14b is passively switched between the boosting operation and the step-down operation in accordance with voltages applied to the low-voltage terminals 12 and the high-voltage terminals 13.

The cutoff transistors 5a, 5b are usually maintained in an on state (an electrically conductive state). The controller 8 monitors states of the upper and the lower arm transistors 3, 4. When detecting a short-circuit failure in any of the transistors 3a to 3c, 4a to 4c of the first power conversion circuit 14a, the controller 8 switches the cutoff transistor 5a to off (cutoff) to cut off the first power conversion circuit 14a from the other circuit. In other words, the controller 8 cuts off a current of the first power conversion circuit 14a. When detecting a short-circuit failure in any of the transistors 3a to 3c, 4a to 4c of the second power conversion circuit 14b, the controller 8 switches the cutoff transistor 5b to off to cut off the second power conversion circuit 14b from the other circuit. In other words, the controller 8 cuts off a current of the second power conversion circuit 14b. Each of the transistors 3a to 3c, 4a to 4c includes a sense emitter that detects a current flowing therein, and the controller 8 can detect a short-circuit failure of each of the transistors by monitoring signals from the sense emitters.

The cutoff transistor 5a (5b) is a transistor for cutting off connection of the power conversion circuit 14a (14b). In other words, the cutoff transistor 5a (5b) is a transistor for cutting off a current of the power conversion circuit 14a (14b). In still other words, the cutoff transistor 5a (5b) is a transistor for cutting off the power conversion circuit 14a (14b) from the other power conversion circuit 14b (14a). Transistors of a type identical to or different from that of the upper arm transistors 3 may be adopted for the cutoff transistors 5a, 5b.

The power converter 10 includes the two power conversion circuits 14a, 14b connected in parallel. The power conversion circuits 14a, 14b include the cutoff transistors 5a, 5b configured to cut off connections of the power conversion circuits 14a, 14b, respectively, when a short-circuit failure occurs in any of the upper and the lower arm transistors 3, 4. Even when a short-circuit failure occurs in any of the two power conversion circuits 14a. 14b, the power converter 10 can maintain its operation by the other power conversion circuit.

In FIG. 1, dashed-line frames denoted by signs 6a to 6d represent power modules, respectively. That is, the three upper arm transistors 3a to 3c of the first power conversion circuit 14a are housed in the power module 6a. Similarly, the three lower arm transistors 4a to 4c of the first power conversion circuit 14a are housed in the power module 6b. The three upper arm transistors 3a to 3c of the second power conversion circuit 14b are housed in the power module 6c. The three lower arm transistors 4a to 4c of the second power conversion circuit 14b are housed in the power module 6d. Moreover, a dashed-line frame denoted by a sign 7 in FIG. 1 represents a power module 7. The cutoff transistor 5a in the first power conversion circuit 14a and the cutoff transistor 5b in the second power conversion circuit 14b are housed in the power module 7. For convenience of description, the power modules 6a to 6d that house the transistors for power conversion circuit (the upper and the lower arm transistors 3, 4) will hereinafter be referred to as the conversion modules 6a to 6d. Moreover, the conversion modules 6a to 6d may be collectively referred to as conversion modules 6. Furthermore, the power module 7 that houses the cutoff transistors 5a, 5b will be referred to as the cutoff module 7.

Figure 2:
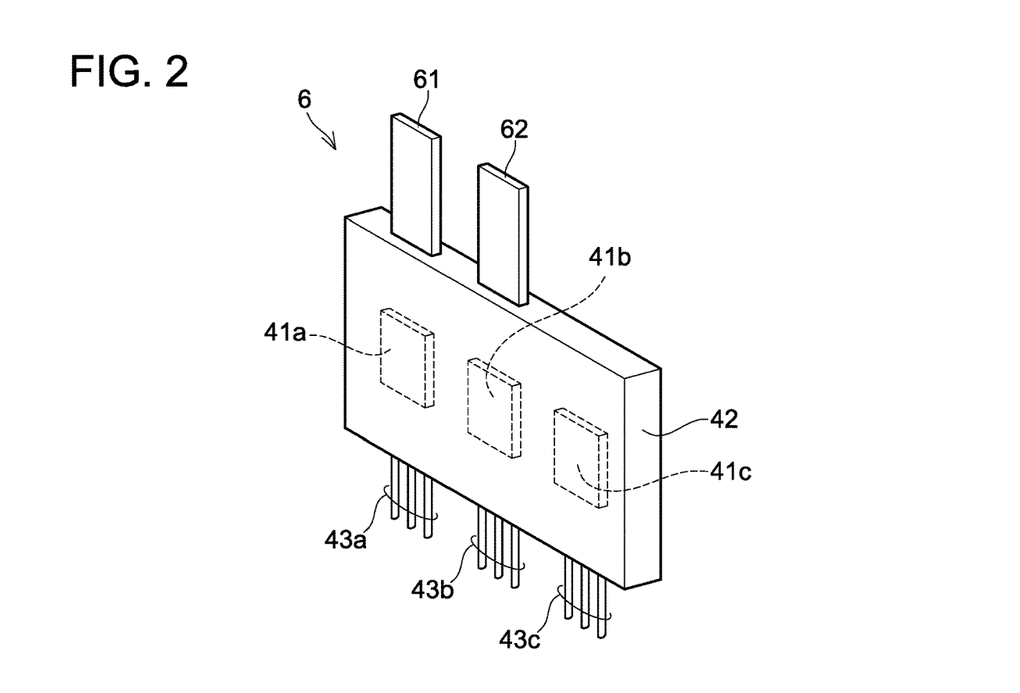
FIG. 2 is a perspective view of a conversion module.
Figure 3:
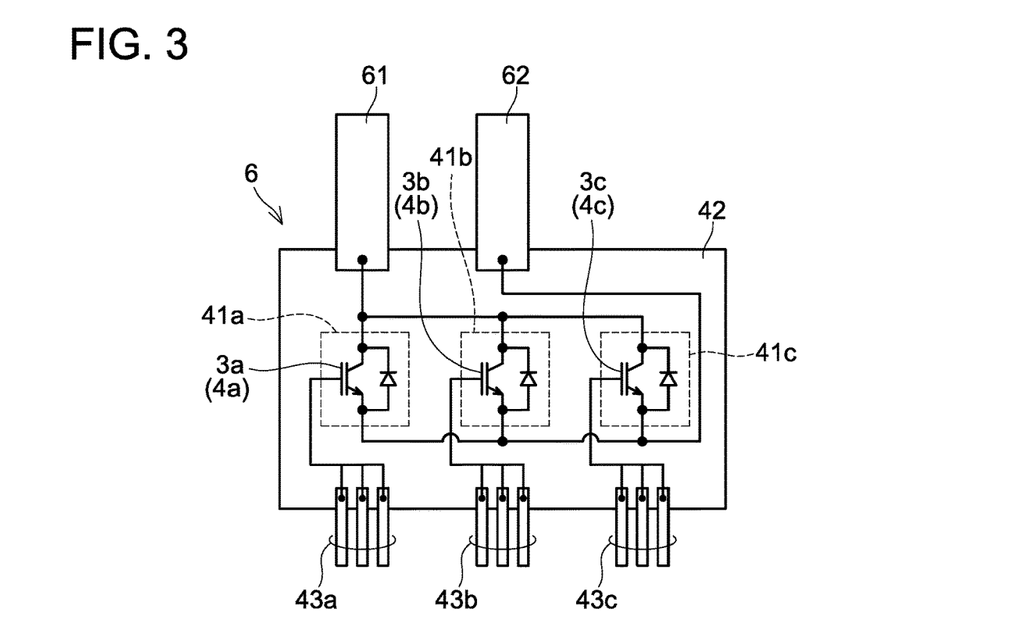
FIG. 3 is a circuit diagram of in the conversion module.

FIG. 2 shows a perspective view of one of the conversion modules 6, and FIG. 3 shows a circuit diagram in the conversion module 6. The conversion module 6 is a device in which three semiconductor chips 41a, 41b, 41c are sealed in a package 42 constituted of resin. The semiconductor chips 41a, 41b. 41c respectively include the transistors 3 and the diodes, and the transistors 3 and the diodes are connected in inverse parallel with each other in the respective semiconductor chips. The semiconductor chip 41a corresponds to the inverse parallel circuit of the transistor 3a (4a) and the diode in the circuit diagram in FIG. 1. The semiconductor chip 41b corresponds to the inverse parallel circuit of the transistor 3b (4b) and the diode in the circuit diagram in FIG. 1. The semiconductor chip 41c corresponds to the inverse parallel circuit of the transistor 3c (4c) and the diode in the circuit diagram in FIG. 1.

A positive power terminal 61 and a negative power terminal 62 extend from an upper surface of the package 42. The positive power terminal 61 is connected to collector electrodes (high potential-side electrodes) of the three transistors 3 (4) in the package 42. The negative power terminal 62 is connected to emitter electrodes (low potential-side electrodes) of the three transistors 3 (4) in the package 42. In other words, the three transistors 3 (4) are connected in parallel in the package 42 of the conversion module 6.

Control terminals 43a. 43b. 43c extend from a lower surface of the package 42. The control terminals 43a are connected to a gate electrode of the transistor 3a (4a). Although not shown, the control terminals 43a are connected to the sense emitter of the transistor 3a (4a) and a temperature sensor provided in the semiconductor chip 41a. The control terminals 43b are connected to a gate electrode and the sense emitter of the transistor 3b (4b), a temperature sensor of the semiconductor chip 41b, and the like. The control terminals 43c are connected to a gate electrode and the sense emitter of the transistor 3c (4c), a temperature sensor of the semiconductor chip 41c, and the like.

Figure 4:
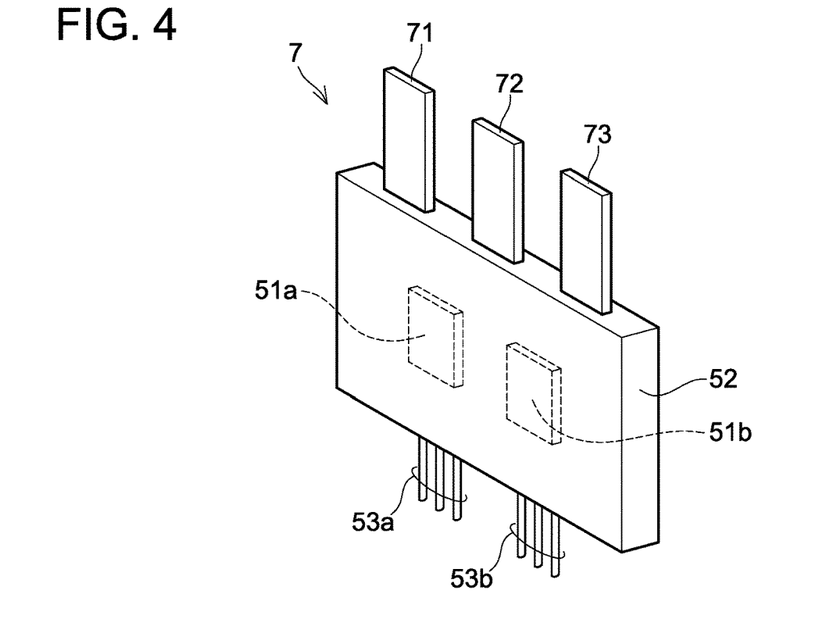
FIG. 4 is a perspective view of a cutoff module.
Figure 5:
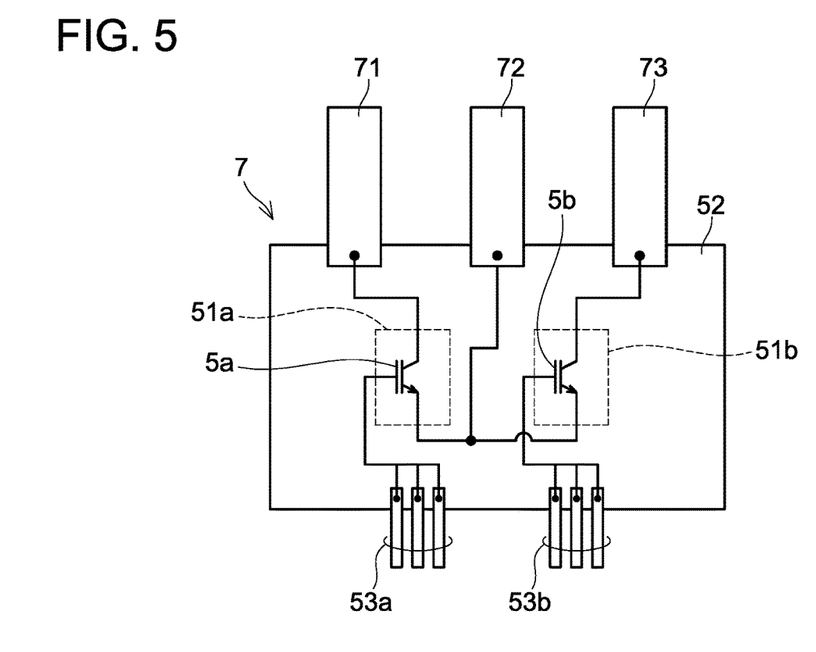
FIG. 5 is a circuit diagram of in the cutoff module.

FIG. 4 shows a perspective view of the cutoff module 7, and FIG. 5 shows a circuit diagram in the cutoff module 7. The cutoff module 7 is a device in which two semiconductor chips 51a. 51b are sealed in a package 52 constituted of resin. The semiconductor chip 51a includes the cutoff transistor 5a, and the semiconductor chip 51b includes the cutoff transistor 5b.

A first positive terminal 71, a common negative terminal 72, and a second positive terminal 73 extend from an upper surface of the package 52. The first positive terminal 71 is connected to a collector electrode (a high potential-side electrode) of the cutoff transistor 5a in the package 52. The second positive terminal 73 is connected to a collector electrode (a high potential-side electrode) of the cutoff transistor 5b in the package 52. The common negative terminal 72 is connected to emitter electrodes (low potential-side electrodes) of the cutoff transistors 5a, 5b in the package 52.

Control terminals 53a, 53b extend from a lower surface of the package 52. The control terminals 53a are connected to a gate electrode and a sense emitter of the cutoff transistor 5a, a temperature sensor of the semiconductor chip 51a, and the like. The control terminals 53b are connected to a gate electrode and a sense emitter of the cutoff transistor 5b, a temperature sensor of the semiconductor chip 51b, and the like. As clearly shown in FIGS. 4 and 5, the respective cutoff transistors 5a, 5b of the two power conversion circuits 14a, 14b are housed in one power module (the cutoff module 7).

Figure 6:
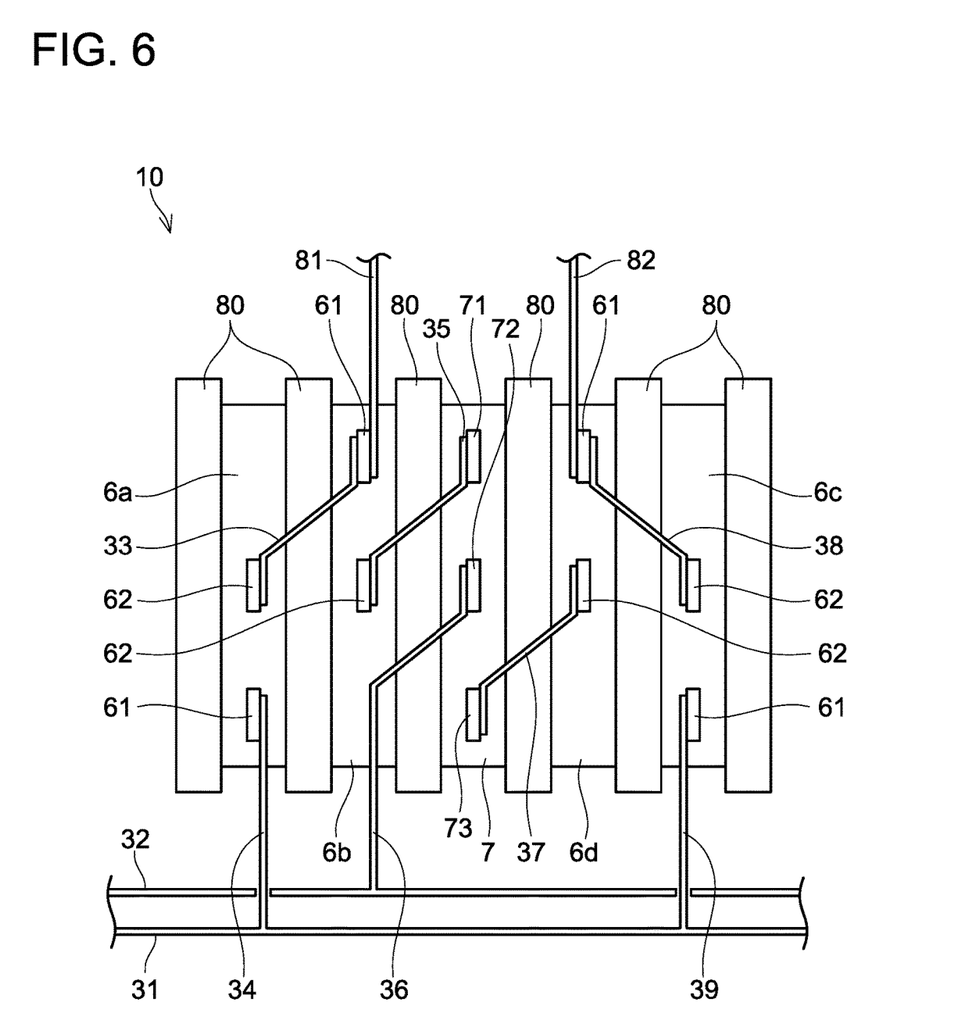
FIG. 6 is a plan view of the power converter.

FIG. 6 shows a plan view of the power converter 10. FIG. 6 shows only the four conversion modules 6 (6a to 6d) and the cutoff module 7, and omits illustration of the reactors 2a, 2b, and the controller 8.

The four conversion modules 6 and the cutoff module 7 are stacked with coolers 80. FIG. 6 is a plan view seeing the conversion modules 6 from their sides on which the power terminals 61, 62 are provided. The conversion modules 6 and the cutoff module 7 are alternately stacked with the coolers 80. The coolers 80 are positioned at both ends of the stack. Each of the conversion modules 6 and the cutoff module 7 is cooled by the coolers 80 from both sides thereof.

As shown in FIG. 1, the conversion modules 6a, 6b are power modules included in the first power conversion circuit 14a, and the conversion modules 6c, 6d are power modules included in the second power conversion circuit 14b. Next, a connection relation among the modules will be described.

The first and the second power conversion circuits 14a, 14b are connected in parallel between a positive bus bar 31 and a negative bus bar 32. As shown in FIG. 1, in the first power conversion circuit 14a, the conversion modules 6a, 6b are connected in series such that the conversion module 6a is positioned on a positive side and the conversion module 6b is positioned on a negative side. The positive power terminal 61 of the conversion module 6a is connected to the positive bus bar 31 by a short bus bar 34, and the negative power terminal 62 of the conversion module 6a is connected to the positive power terminal 61 of the conversion module 6b by a short bus bar 33. The short bus bar 33 corresponds to the midpoint of the series connection of the two of the upper arm transistors 3 (the conversion module 6a) and the lower arm transistors 4 (the conversion module 6b). The positive power terminal 61 of the conversion module 6b is connected to the reactor 2a, which is not shown, by a short bus bar 81. The negative power terminal 62 of the conversion module 6b is connected to the first positive terminal 71 of the cutoff module 7 by a short bus bar 35. The common negative terminal 72 of the cutoff module 7 is connected to the negative bus bar 32 by a short bus bar 36. The connection relation among the transistors in the first power conversion circuit 14a has been described above.

In the second power conversion circuit 14b, the conversion modules 6c, 6d are connected in series such that the conversion module 6c is positioned on a positive side and the conversion module 6d is positioned on a negative side. The positive power terminal 61 of the conversion module 6c is connected to the positive bus bar 31 by a short bus bar 39, and the negative power terminal 62 of the conversion module 6c is connected to the positive power terminal 61 of the conversion module 6d by a short bus bar 38. The short bus bar 38 corresponds to the midpoint of the series connection of the upper arm transistors 3 (the conversion module 6c) and the lower arm transistors 4 (the conversion module 6d). The positive power terminal 61 of the conversion module 6d is connected to the reactor 2b, which is not shown, by a short bus bar 82. The negative power terminal 62 of the conversion module 6d is connected to the second positive terminal 73 of the cutoff module 7 by a short bus bar 37. As mentioned before, the common negative terminal 72 of the cutoff module 7 is connected to the negative bus bar 32 by the short bus bar 36. The connection relation among the transistors in the second power conversion circuit 14b has been described above.

As shown in FIG. 6, the cutoff module 7 is interposed between the conversion modules 6a, 6b included in the first power conversion circuit 14a and the conversion modules 6c, 6d included in the second power conversion circuit 14b. The conversion modules 6a, 6b are stacked back to back so as not to allow their positive power terminals 61 to be opposed each other, and the conversion modules 6c, 6d are also stacked back to back so as not to allow their positive power terminals 61 to be opposed each other. As shown in FIG. 6, all of the power terminals can be connected by the short bus bars 33 to 39. The arrangement of the modules in FIG. 6 is convenient for connecting the modules by the short bus bars.

Features and advantages of the power converter 10 will be summarized below. The power converter 10 includes the two power conversion circuits 14a, 14b connected in parallel. The power conversion circuits 14a, 14b respectively include the cutoff transistors 5a, 5b configured to cut off connection of the corresponding power conversion circuits when a short-circuit failure is detected in any of the transistors for power conversion (the upper and the lower arm transistors 3, 4). The cutoff transistors 5a, 5b of the two power conversion circuits 14a, 14b are housed in one power module (the cutoff module 7). By housing the cutoff transistors 5a, 5b of the two power conversion circuits 14a, 14b in one power module (the cutoff module 7), the power converter 10 can be downsized.

Each of the power conversion circuits 14a, 14b includes the transistors for power conversion (the upper arm transistors 3a to 3c and the lower arm transistors 4a to 4c) connected in parallel. The transistors for power conversion connected in parallel (the upper arm transistors 3 and the lower arm transistors 4) are respectively housed in different power modules (the conversion modules 6a to 6d). As shown in FIGS. 2 and 3, the three transistors connected in parallel (the upper arm transistors 3a to 3c, and the lower arm transistors 4a to 4c) are densely wired in one package 42. By housing the transistors connected in parallel in one power module, therefore, an uniform current can flow in these transistors.

The first conversion modules 6a, 6b included in the first power conversion circuit 14a and the second conversion modules 6c, 6d included in the second power conversion circuit 14b are stacked with the cutoff module 7 interposed therebetween. The cutoff module 7 houses the first cutoff transistor 5a configured to cut off connection of the first power conversion circuit 14a and the second cutoff transistor 5b configured to cut off connection of the second power conversion circuit 14b. As shown in FIG. 6, the above arrangement of the power modules can shorten the short bus bars that connect the modules. A power converter that includes four power conversion circuits connected in parallel can be achieved by adopting two sets of the stacks in FIG. 6.

Second Embodiment

Figure 7:
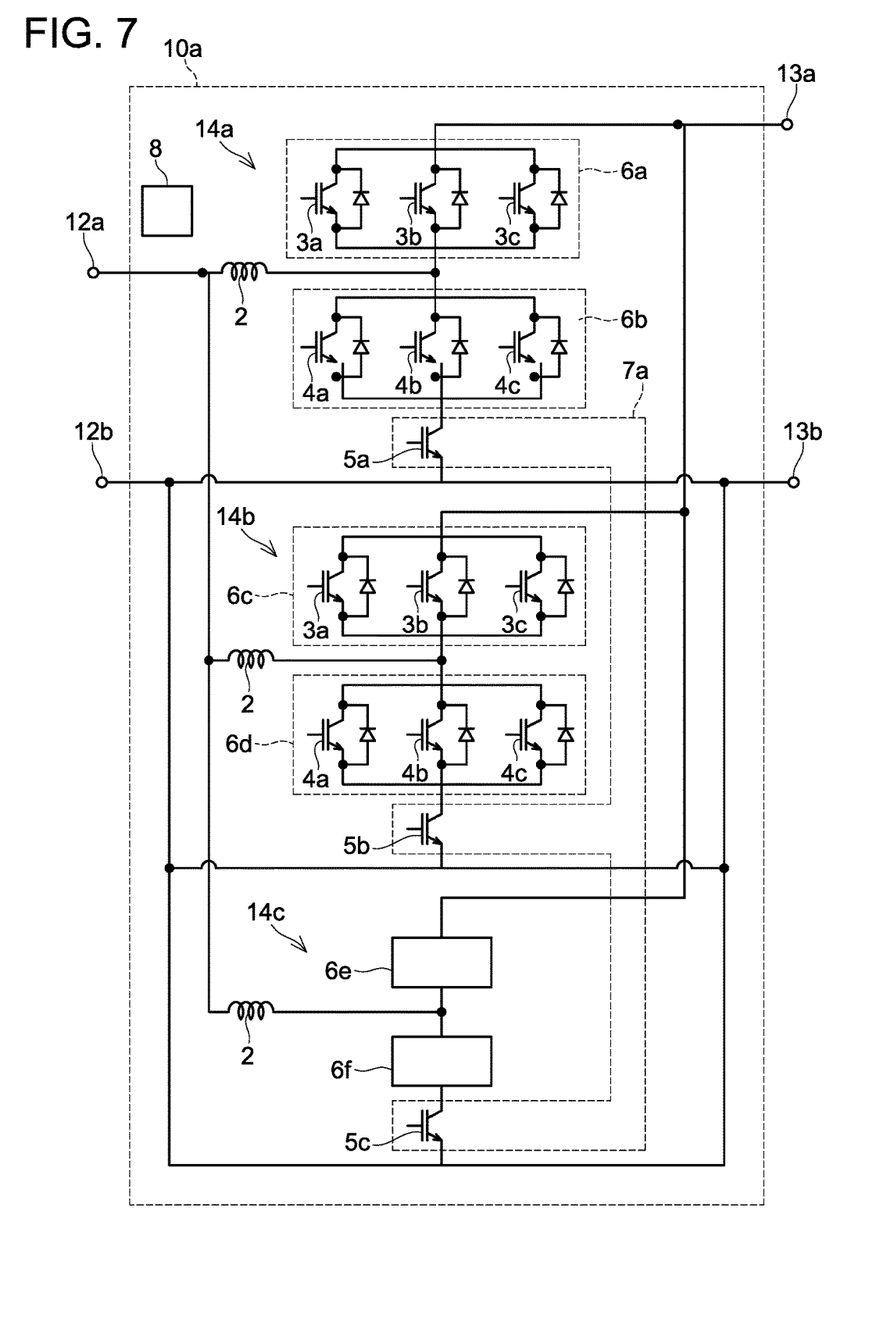
FIG. 7 is a circuit diagram of a power converter in a second embodiment.
Figure 8:
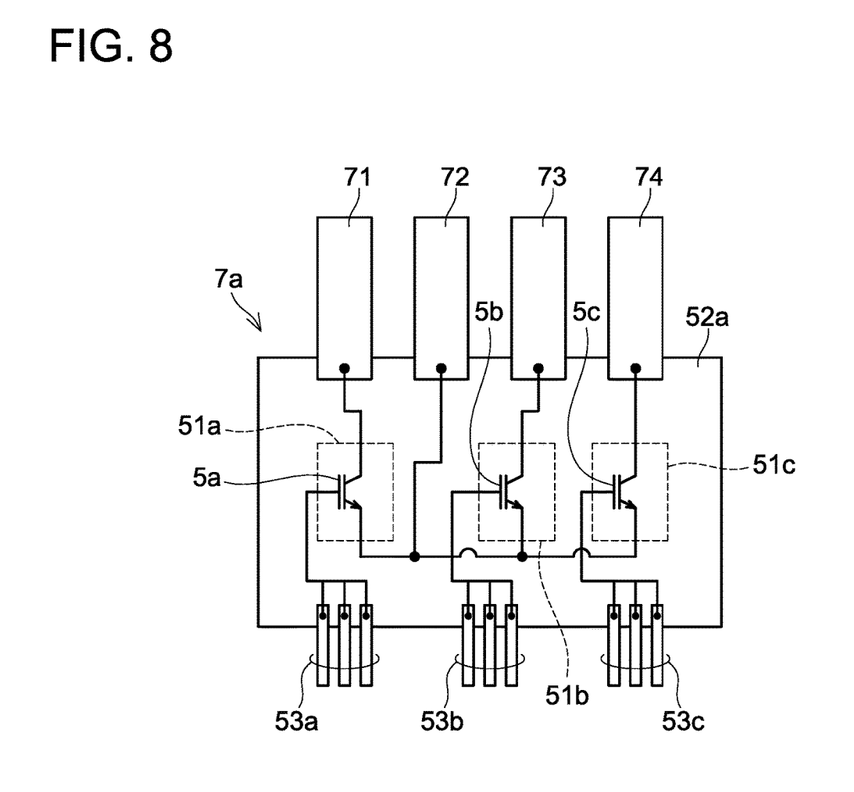
FIG. 8 is a circuit diagram of inside of a cutoff module in the power converter in the second embodiment.

With reference to FIGS. 7 and 8, a power converter 10a in a second embodiment will be described. FIG. 7 is a circuit diagram of the power converter 10a in the second embodiment. The power converter 10a includes three power conversion circuits 14a to 14c connected in parallel. The power conversion circuits 14a, 14b are the same as the power conversion circuits 14a, 14b included in the power converter 10 in the first embodiment. The third power conversion circuit 14c also has the same configuration as those of the power conversion circuits 14a, 14b. FIG. 7 omits detailed circuit diagrams of conversion modules 6e, 6f. The conversion module 6e is the same as the conversion module 6a. In the conversion module 6e, s the three upper arm transistors 3a to 3c are connected in parallel in a resin package, and each of the upper arm transistors 3a to 3c has a diode connected in inverse parallel therewith. The conversion module 6f is the same as the conversion module 6b. In the conversion module 6f, the three lower arm transistors 4a to 4c are connected in parallel in a resin package, and each of the lower arm transistors 4a to 4c has a diode connected in inverse parallel therewith. The conversion modules 6e, 6f, and a third cutoff transistor 5c are connected in series. The controller 8 monitors the transistors of the conversion modules 6e, 6f, and switches the third cutoff transistor 5c from on to off when detecting a short-circuit failure in any of the transistors for power conversion (the upper and the lower arm transistors 3, 4) to cut off connection of the third power conversion circuit 14c.

The cutoff transistors 5a to 5c are housed in one power module (a cutoff module 7a). FIG. 8 shows a circuit diagram of the cutoff module 7a. The cutoff module 7a is a device in which three semiconductor chips 51a, 51b, 51c are embedded in a package 52a constituted of resin. The semiconductor chip 51a includes the cutoff transistor 5a, the semiconductor chip 51b includes the cutoff transistor 5b, and the semiconductor chip 51c includes the cutoff transistor 5c.

The first positive terminal 71, the common negative terminal 72, the second positive terminal 73, and a third positive terminal 74 extend from an upper surface of the package 52a. The first positive terminal 71 is connected to the collector electrode (the high potential-side electrode) of the cutoff transistor 5a in the package 52a. The second positive terminal 73 is connected to the collector electrode (the high potential-side electrode) of the cutoff transistor 5b in the package 52a. The third positive terminal 74 is connected to a collector electrode (a high potential-side electrode) of the cutoff transistor 5c in the package 52a. The common negative terminal 72 is connected to emitter electrodes (low potential-side electrodes) of the cutoff transistors 5a, 5b, 5c in the package 52.

Control terminals 53a, 53b. 53c extend from a lower surface of the package 52a. The control terminals 53a are connected to the gate electrode and the sense emitter of the cutoff transistor 5a, the temperature sensor of the semiconductor chip 51a, and the like. The control terminals 53b are connected to the gate electrode and the sense emitter of the cutoff transistor 5b. the temperature sensor of the semiconductor chip 51b, and the like. The control terminals 53c are connected to a gate electrode and a sense emitter of the cutoff transistor 5c, a temperature sensor of the semiconductor chip 51c, and the like. The respective cutoff transistors 5a to 5c of the three power conversion circuits 14a to 14c are housed in one cutoff module 7a. Also in the power converter 10a in the second embodiment, the cutoff transistors 5a to 5c respectively included in the three power conversion circuits 14a to 14c are housed in one power module (the cutoff module 7a), so the power converter 10a can be downsized.

Moreover, the following advantages can be achieved by housing the cutoff transistors 5a to 5c of the conversion modules 14a to 14c in one power module. If the cutoff transistors 5a to 5c are respectively housed in separate power modules, the power modules are at different distances from the controller 8. The difference in distances from the controller 8 causes a difference in time lags between when the controller 8 transmits a cutoff command and when each of the cutoff transistors 5a to 5c starts to operate. It is undesirable that there is the difference in time lags before cutoff of the power conversion circuits depending on circuits to be cut off. On the other hand, by housing the cutoff transistors of the power conversion circuits in one power module, current paths from the controller 8 to the respective cutoff transistors are approximately equal. The time lags before cutoff of the power conversion circuits, therefore, are made equal, regardless of which of the circuits to be cut off.

Points to be noted relating to the technique described in the embodiments will be described. Each of the power conversion circuits 14a to 14c in the embodiments is a bidirectional DC-DC converter. Each of the power conversion circuits connected in parallel may be a boost converter, a step-down converter, an inverter, or the like. Each of the power conversion circuits 14a to 14c in the embodiments includes three transistors connected in parallel. Each of the power conversion circuits may include two transistors connected in parallel, or four or more transistors connected in parallel.

The cutoff module 7 corresponds to an example of a first module. Each of the conversion modules 6a to 6f corresponds to an example of a second module.

Each of the cutoff transistors 5a, 5b, 5c corresponds to an example of a cutoff switch. Each of the upper and the lower arm transistors 3, 4 corresponds to an example of a switching element for power conversion.

Specific examples of the present invention have been described in detail, however, these are mere exemplary indications and thus do not limit the scope of the claims. The art described in the claims include modifications and variants of the specific examples presented above. Technical features described in the description and the drawings may technically be useful alone or in various combinations, and are not limited to the combinations as originally claimed. Further. the art described in the description and the drawings may concurrently achieve a plurality of aims, and technical significance thereof resides in achieving any one of such aims.

What is claimed is:

1. A power converter comprising:
power conversion circuits connected in parallel; and
a cutoff switch provided in each of the power conversion circuits, the cutoff switch configured to cut off connection of corresponding one of the power conversion circuits from other power conversion circuit,
wherein the cutoff switches of the power conversion circuits are housed in a first module.

2. The power converter according to claim 1 wherein each of the power conversion circuits includes a plurality of switching elements for power conversion, and the switching elements are connected in parallel, and
the switching elements connected in parallel are housed in a second module.

3. The power converter according to claim 2 wherein the power converter includes two of the power conversion circuits,
the second module includes two second modules which correspond to the two power conversion circuits respectively and the two second modules are arranged so as to interpose the first module therebetween and
the first module houses the cutoff switches of the two power conversion circuits.

4. The power converter according to claim 2 wherein the two second modules is arranged back to back each other.

* * * * *